United States Patent [19]

Ikariishi et al.

[11] Patent Number: 4,527,915
[45] Date of Patent: Jul. 9, 1985

[54] SEALED MULTI-ROW ROLLER BEARING DEVICE FOR ROLLING MILLS

[75] Inventors: Koichi Ikariishi, Ichichara; Toshiaki Kitano, Higashiosaka; Masanori Shinohara; Yasuo Shimoji, both of Kashiwara, all of Japan

[73] Assignees: Kawasaki Steel Corporation, Kobe; Koyo Seiko Company Limited, Osaka, both of Japan

[21] Appl. No.: 615,901

[22] Filed: May 29, 1984

[30] Foreign Application Priority Data

May 31, 1983 [JP] Japan .................................. 58-97637

[51] Int. Cl.³ .......................................... F16C 33/80
[52] U.S. Cl. ................................................ 384/480
[58] Field of Search ............... 384/480, 144, 584, 542; 277/56

[56] References Cited

U.S. PATENT DOCUMENTS

| | | | |
|---|---|---|---|
| 1,916,682 | 7/1933 | Ovestrud | 384/480 |
| 1,991,077 | 2/1935 | Brittain | 384/480 |
| 2,176,294 | 10/1939 | Cox | 384/480 |
| 3,343,891 | 9/1967 | Shipman | 384/144 |
| 4,093,324 | 6/1978 | Carrigan | 384/480 |
| 4,379,901 | 4/1983 | Muller | 384/480 |

OTHER PUBLICATIONS

Japanese Patent Publication 80-22648 of Jun. 18, 1983.

Primary Examiner—Lenard A. Footland
Attorney, Agent, or Firm—Mason, Fenwick & Lawrence

[57] ABSTRACT

A sealed multi-row roller bearing device for rolling mills, wherein the opposite ends of the inner race are extended, and a plurality of inner annular bodies which are of one of the groups of elements defining labyrinths are fitted on the extension of the inner race, while outer annular bodies which are of the other group of elements defining labyrinths are removably connected to the end of the outer race.

8 Claims, 8 Drawing Figures

SEALED MULTI-ROW ROLLER BEARING DEVICE FOR ROLLING MILLS

BACKGROUND OF THE INVENTION

This invention relates to a sealed multi-row roller bearing device for rolling mills.

In modern high speed rolling mills, a large amount of cooling water is fed for shape control of the rolls in order to secure the sheet thickness accuracy of products. In bearings used as roll neck bearings for such rolling mills, the environment around the bearing box in which the bearing is housed is far more degraded than in conventional equipment, so that some sealing measures or other are required.

As for sealed bearing devices for rolling mill roller necks in which sealing measures of this type are taken, one shown in FIGS. 1 and 2 of Japanese Patent Application Disclosure No. 22648/1980 has been in use these years. A bearing 1 which bears a roll neck 8 inside a bearing box 7 is a 4-row conical roller bearing, wherein, at the opposite ends of the bearing, the outer ends of inner races 2 are axially extended to form inner race extension annular portions 2a, while seal retainer rings 4 are socket-and-spigot-wise removably fitted to the outer end surfaces of outer races 3, so that seal bodies 5 of rubber held in the seal retainer rings 4 are slidably contacted with the outer peripheral surfaces of said inner race extension annular portions 2a, the opposite ends of the bearing 1 being thus sealed by contact type sealing mechanisms 6. Thus, in this bearing 1, not only by a conventional sealing mechanism having contact type seal bodies 9a, 9b, and 9c installed between it and the roll neck 8 at the opposite ends of the bearing box 7, but also in the bearing box, sealing is effected at the opposite ends of the bearing 1 in the bearing box 7, so that entry of cooling water into the bearing 1 is prevented by the two-stage barrier. Further, leakage of grease fed to the bearing 1 is also prevented, so that there is no need to feed grease each time the rolls are exchanged, and hence the consumption of grease can be reduced.

However, modern rolling mills are operated at high speed, and if the aforesaid conventional bearing sealing mechanism is used in such rolling mills, the inner pressure of the bearing is increased by the rotation of the bearing and the gas in the bearing develops volumetric expansion due to heating by rotation. However, since the seal bodies 5 are in slide contact with the outer peripheral surfaces of the extension annular portions 2a of the inner races 2, passage of gas between the interior and exterior of the bearing cannot be smoothly effected, and in the cycle of the bearing, "high speed rotation→reduced speed rotation→stoppage," a violent inhaling action takes place, entailing entry of cooling water into the bearing or leakage of the grease in the bearing. Further, since the rotative speed of the roll neck is far greater than the permissible peripheral speed of the rubber forming the seal bodies 5, the slide portions of the seal bodies 5 tend to wear out or the seal bodies 5 are hardened by the heat of friction, suffering elasticity degradation, which rapidly lowers the sealing performance. Particularly because seal bodies 9a, 9b, and 9c are disposed at the opposite ends of the bearing box 7, the seal bodies 5 can hardly be cooled by cooling water and hence the heat of friction increases to accelerate elasticity degradation.

Furthermore, a sealing mechanism to be applied to a rolling mill which employs a roll shift mechanism and a strong bender, such as a modern rolling mill, must have the ability to cope with a large amount of deflection of the axis in view of a large amount of bending of the rolls. However, the aforesaid contact type sealing mechanism cannot satisfactorily cope with such deflection of the axis, and in this respect, too, there is a problem in the sealing performance.

Further, in the aforesaid bearing 1, as the diameter of the bearing is increased, the cross-sectional shape of the seal bodies 5 must be similarly enlarged; if not, predetermined sealing performance could not be obtained. Thus, the width of the sealing mechanism increases and hence the effective width of the bearing correspondingly, reduces, thereby reducing the load carrying capacity. Further, since the seal retainer rings 4 are simply socket-spigot-wise removably fitted to the outer races 3, there is the danger of their slipping off the outer races when the bearing is attached to and detached form the roll neck, thus resulting in damaging the seal bodies.

SUMMARY OF THE INVENTION

This invention has for its object the provision of a sealed multi-row roller bearing device for rolling mills, wherein the aforesaid problem found in the conventional example is eliminated, when it is applied to the roll neck of a high speed rolling mill sufficient sealing performance is obtained, any deflection of axis can be coped with and hence the sealing effect is not spoiled, the width dimension of the sealing mechanism in the bearing does not increase when the diameter of the bearing is increased, and the handling of the device, as when removed form or installed in the bearing box, is facilitated.

According to the sealed multi-row roller bearing device of this invention, at the opposite ends of the bearing assembly, the outer ends of the inner races are axially extended beyond the ends of the outer races to form inner race extension annular portions. On the other hand, there are provided a plurality of inner annular bodies each having respective outward flanges and axially put together and connected by clamp means, and engaged with the outer peripheral surfaces of the inner race extension annular portions so that the inner annular bodies which are inwardly nearest to the bearing cannot be easily separated from the inner race extension annular portions, and a plurality of outer annular bodies each having respective inward flanges and axially put together concentrically with the inner annular bodies so that the inward flanges alternate with the outward flanges to define clearances therebetween, said outer annular bodies being separably connected by clamp means and positioned at the ends of the outer races. In the present invention, since the so-called non-contact type sealing means of the aforesaid construction are provided at the opposite ends of said bearing assembly, the following effects can be attained.

(1) The rotation of the bearing assembly increases the inner pressure, and the gas in the bearing assembly develops volumetric expansion due to the generation of heat by said rotation. However, since the inner and outer annular bodies are sealed in non-contact relation, the pressures inside and outside the bearing are always equal, so that even if the cycle of the bearing, "high speed rotation→reduced speed rotation→stoppage," is repeated, no inhaling action takes place and hence entry of cooling water into the bearing assembly or leakage of the grease in the bearing can be prevented.

(2) At the opposite ends of the bearing assembly, the region between the ends of the inner and outer races can be sealed with the non-contact state maintained. When the device is used as a bearing for the roll neck of a high speed rolling mill, it develops a high sealing effect for a long time without causing the trouble, found in the contact type sealing mechanism-equipped bearing device described above as a conventional example, of the sealing performance being rapidly lowered owing to the wear of the seal bodies and degradation of the seal body material due to the heat of friction. The rotation of the bearing results in the formation of air curtains in the small clearances in the sealing device, so that the higher the rotative speed of the bearing, the greater the sealing effect. Further, the deflection of axis can be well coped with in the case of the non-contact type seal, so that the sealing effect is not lowered, and the bearing device can be effectively applied to a rolling mill employing a roll shift mechanism and a powerful bender.

(3) Since the opposite ends of the bearing assembly are sealed and since the components of the sealing device remain inseparable unless a disassembling procedure is taken, the sealing effect of preventing leakage of grease from within the bearing device can be attained. As a result, the need for supplying grease each time the rolls of the rolling mill are exchanged is eliminated. Further, the fact that the sealing device is inseparable from the bearing assembly makes easier the withdrawal of the bearing assembly from the bearing box and the mounting of the bearing assembly in the bearing box. Particularly, the inner annular body inwardly nearest to the bearing assembly is shrinkage-fitted to the inner race extension annular portion, while the other inner race annular bodies and the outer annular bodies are constructed so that they can be disassembled by undoing the socket-and-spigot connection. As a result, grease can be supplied to the bearing according to circumstances and the maintenance and inspection of the bearing can be easily carried out.

(4) Generally, as the inner diameter of the inner race of a bearing increases, the load carrying capacity increases. In the case of the conventional sealing mechanism-equipped bearing device, unless an increase in the inner diameter of the inner race is accompanied by an approximately similar enlargement of the overall shape of the seal bodies, predetermined sealing performance cannot be attained; thus, the width of the sealing mechanism is inevitably increased. Therefore, the effective width of the bearing assembly is decreased by the amount corresponding to the increase in the width of the sealing mechanism, making it difficult to increase the load carrying capacity. In contrast, since the bearing of this invention has a non-contact type sealing device attached thereto, an increase in the inner diameter of the inner races does not necessitate correspondingly increasing the width of the sealing device, it being only necessary to increase the diameter of the annular bodies, so that there is no possibility of interfering with increaseing the load carrying capacity of the bearing.

DESCRIPTION OF THE PREFERRED EMBODIMENTS

A first embodiment of this invention will now be described with reference to FIGS. 3 and 4.

Figure 1:
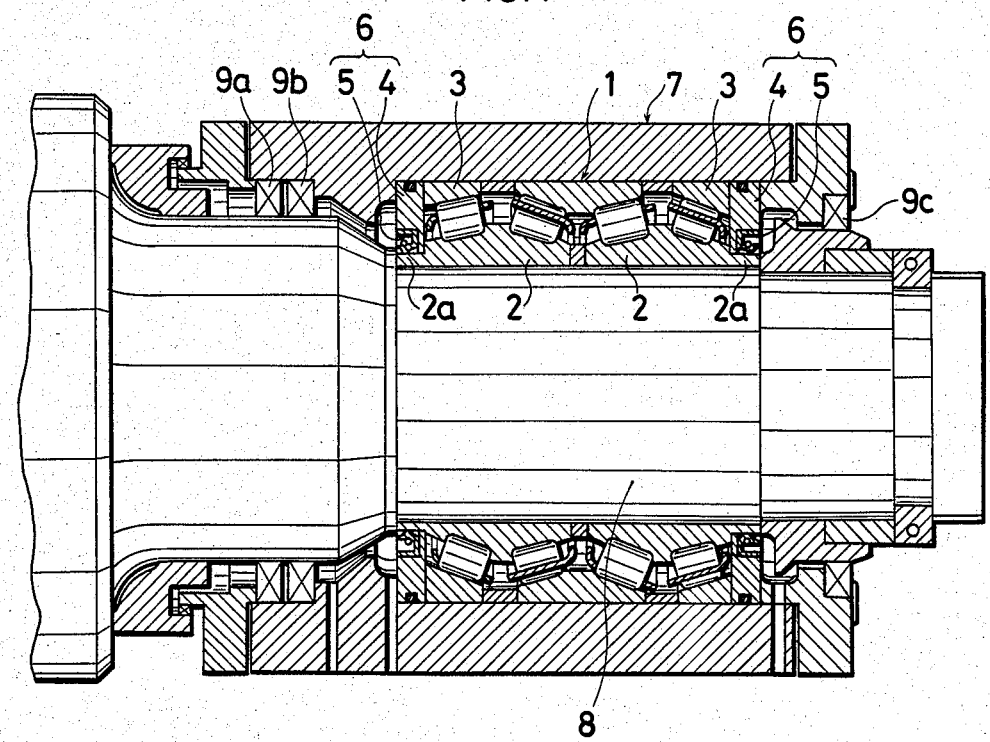
FIG. 1 is a sectional view showing how a conventional sealed multi-row roller bearing device for rolling mills is installed.
Figure 2:
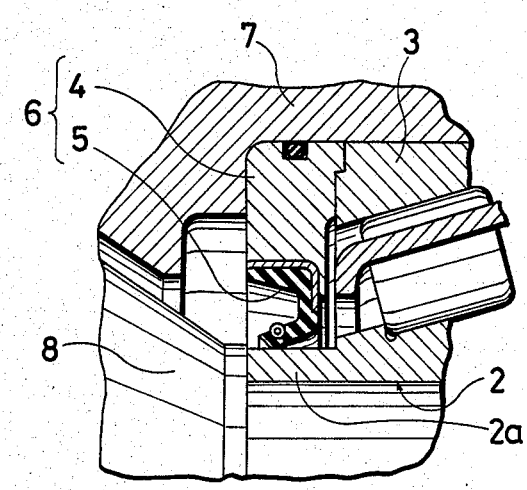
FIG. 2 is an enlarged sectional view of the sealing mechanism portion thereof.
Figure 3:
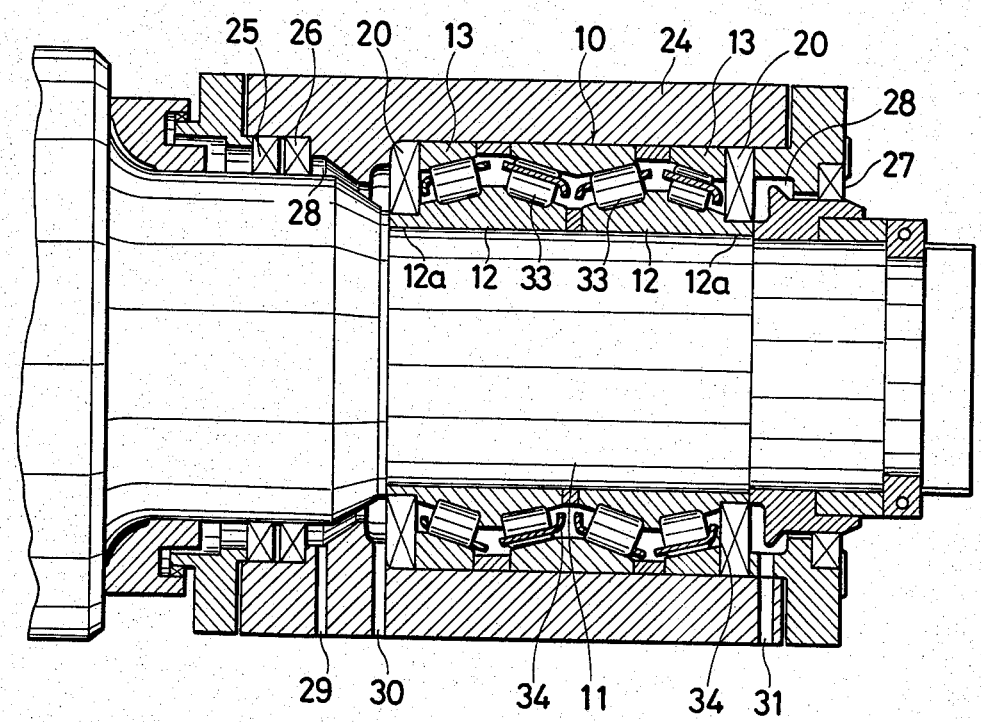
FIG. 3 is a sectional view showing how a rolling mill roll neck is supported by the sealed multi-row roller bearing device of this invention.

A bearing assembly 10 in this embodiment, as shown in FIG. 3, is an application of a 4-row conical roller bearing supporting the roll neck 11 of a rolling mill in a bearing box 24. At the opposite ends of the bearing assembly 10, the small flange end of each inner race 12 is axially extended beyond the end edge of the associated outer race 13 to form an inner race extension annular portion 12a, as shown in FIG. 4.

On the other hand, a plurality (three, in FIG. 4) of inner annular bodies 14, 15, and 16 formed with outward flanges 14a, 15a, and 16a, respectively, are axially put together and connected and then fitted on said inner race extension annular portion 12a. Separate from said inner annular bodies 14, 15, and 16, a plurality (two, in FIG. 4) of outer annular bodies 17 and 18 formed with inward flanges 17a and 18a, respectively, are axially put-together concentrically with the inner annular bodies 14, 15, and 16 so that the inward flanges 17a and 18a alternate with the outward flanges 14a, 15a, and 16a of said inner annular bodies 14, 15, and 16, said outer annular bodies being connected and positioned at the end surface of the associated outer race 13. In this way, a small clearance 19 is defined between the outer peripheries of the inner annular bodies 14, 15, and 16 and the inner peripheries of the outer annular bodies 17 and 18, and thus the regions between the inner and outer races 12 and 13 at the opposite ends of the bearing assembly are sealed by non-contact type sealing devices 20.

The inner annular bodies 14, 15, and 16 and the outer annular bodies 17 and 18 are so disposed that the order of arrangement of the flanges arranged from the inside to the outside of the bearing assembly 10 is such that an outward flange comes first, and an annular projection 14c formed on the inner peripheral surface of the inner annular body 14 disposed inwardly nearest to the bearing is shrinkage-fitted in an annular races 12b formed in the inner race extension annular portion 12a. The connection of the inner annular body 14 to the other inner annular bodies 15 and 16 is effected by clamp fixation using a screw 21 so that they can be separated afterwards.

The outer annular body 17 has an annular recess 17b formed in its end surface, said recess being removably socket-and-spigot-wise fitted to an annular projection 13a formed o the end surface of the associated outer race 13, and the connection of said outer annular body 17 to the remaining outer annular body 18 is effected by clamp fixation using a screw 22 so that they can be separated afterwards. In addition, the depth of said socket-and-spigot connection is such that even if the outer annular body 17 is axially moved, its slipping off the outer race 13 due to the presence of the axial clearances defined between the outward and inward flanges is prevented as by making said depth greater than the axial clearance between the outward flange 16a and the inward flange 18a.

Figure 4:
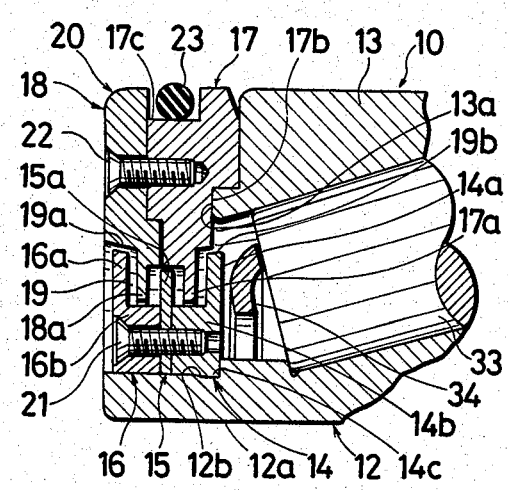
FIGS. 4 through 7 are sectional views showing embodiments of this invention.

In FIG. 4, the inner annular body 15, which is disposed in the intermediate position, unlike the right and left inner annular bodies 14 and 15, is not formed on its inner periphery with a thick spacer portion, such as shown at 14b and 16b, and instead it has the same thickness as its outer periphery which serves as the outward flange 15a; said spacer portions 14b and 16b may be formed on any inner annular bodies so long as suitable clearances can be defined between adjacent outward flanges. the same is true of the outer annular bodies 17 and 18.

In this embodiment where the outward flange 14a is positioned inwardly nearest to the bearing assembly, the attachment of the annular bodies to the bearing assembly 10 is effected in the order of 14, 17, 15, 18, and 16. Further, the maintenance and inspection of the bearing are effected in an order reverse to the annular body attaching order by first removing the screws 21 and 22, then disassembling the annular bodies in the order of 16, 18, 15, and 17, and finally removing the outer race 13 from the bearing assembly 10. In addition, since the inner annular 14 is shrinkage-fitted to the extension annular portion 12a of the inner race 12, it remains together with the inner race 12.

In FIG. 4, the numeral 23 denotes an O-ring fitted in a peripheral groove 17c formed in the outer periphery of the outer annular body 17, thereby sealing the region between the inner peripheral surface of the bearing box 24 in which the bearing assembly 10 is housed and the outer peripheral surface of the outer annular body 17. Thereby, the water is prevented from flowing over the outer peripheral surface of the outer annular body 17 and entering the bearing assembly 10 via the fitting region between the outer annular body 17 and the outer race 13. On the other hand, at the inner race extension annular portion 12a, since the inner annular body 14 is shrinkage-fitted thereto, there is no possibility of water entering the bearing assembly 10 across the outer peripheral surface of the inner race extension annular portion 12a.

The peripheral end surfaces of the outward flanges 14a and 16a of the inner annular bodies 14 and 16 and the predetermined inner peripheral surface areas of the outer annular bodies 17 and 18 opposed thereto are tapered so that the openings 19a and 19b of the small clearance 19 defined between the inner annular bodies 14, 15, and 16 the outer annular bodies 17 and 18, which open outwardly and inwardly of the bearing, respectively, are slightly inclined toward the outer diameter. This arrangement ensures that water and dust entering the small clearance 19 from the opening 19a are discharged out of the small clearance 19 by the centrifugal force developed by the rotation of the inner race 12 and that, on the inner side of the bearing, grease entering the small clearance 19 from the opening 19b is similarly centrifugally pushed back into the bearing assembly 10.

In FIG. 3, the numerals 25, 26, and 27 denote contact type end seal bodies which seal between the beairng box 24 and the roll neck 11 at the opposite ends of the bearing box 24 axially separated form the interior where the bearing assembly 10 is housed, said seal bodies serving to prevent entry of water and dust from the opposite ends of the bearing box 24.

Between the position of installation of the sealing device 20 for sealing between the inner and outer races 12 and 13 of the bearing assembly, and said end seal bodies 25, 26, and 27, there are clearance 28 defined between the bearing box 24 and the roll neck 11, and downward drain holes 29, 30, an 31 through which said clearances 28 communicate with the outside of the bearing box 24. Thus, most of the water breaking through the end seal bodies 25, 26, and 27 and entering the clearances 28 is discharged out of the box through these drain holes 29, 30, and 31. The numeral 33 denotes conical rollers, and 34 denotes a retainer formed of a steel sheet.

Figure 5:
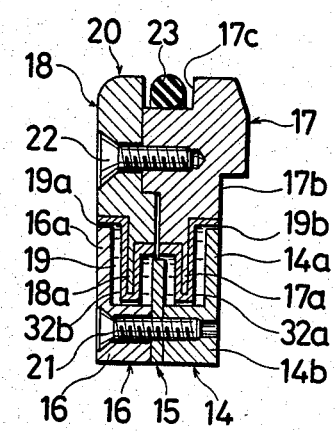

A second embodiment of this invention is shown in FIG. 5.

In this bearing assembly 10, the inner peripheral surfaces of outer annular bodies 17 and 18 of metal material are coated with a lubricating non-metal material 32a, 32b, while inner annnular bodies 14, 15, and 16 are made of metal material and used as such, not being coated with a non-metal material. As a result of this arrangement, even if the outward flanges 14a, 15a, and 16a contact the inward flanges 17a and 18a owing to an error of assembly, there is no possibility of a spark being produced and hence accidents such as a fire can be precluded. The coating with non-metal material may be applied to the outer peripheral surfaces of the inner annular bodies 14, 15, and 16 instead of to the outer annular bodies 17 and 18, or the outer annular bodies 17 and 18 or the inner annular bodies 14, 15, and 16 may be made entirely of non-metal material, or these may be optionally combined. In FIG. 5, the openings 19a and 19b of the small clearance 19 are not inclined toward the outer diameter, but they may be inclined as in FIG. 4. The rest of the arrangement is the same as in the preceding embodiment.

Figure 6:
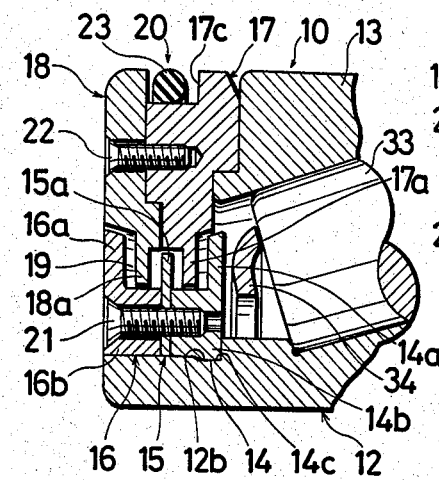

A third embodiment of this invention is shown in FIG. 6.

In this embodiment, in consideration of the sealing devices 20 being handled in the state of not being separated from the bearing assembly 10 as in the case of removing the bearing assembly 10 from the bearing box, of the flanges of the inner annular bodies 14, 15, and 16 or outer annular bodies 17 and 18, the one exposed at the outermost side is made thicker than the other flanges. This arrangement prevents the sealing devices 20 from being damaged when struck by other members or subjected to an impact form the outside. In FIG. 6, the outward flange 16a of the inner annular body 16 is made thicker, but there are cases where the inward flange of the outer annular body would be exposed at the outermost side depending upon the number of annular bodies combined and the order of arrangement, in which case it will be made thicker. The rest of the arrangement is the same as in the first embodiment.

Figure 7:
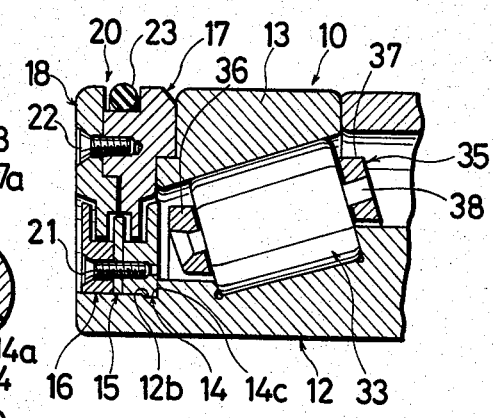

A fourth embodiment of this invention is shown in FIG. 7.

The attachment of the aforesaid sealing devices 20 to the bearing assembly 10 inevitably increases the width of the inner races 12, and in remodeling the existing equipment, the effective width of the bearing assembly 10 is more or less decreased and so is the load carrying capacity. As measures against it, the retainer 34 formed of a steel sheet in FIG. 6 is replaced in this embodiment by the so-called pin type in which a ring member 36 formed with a pocket for receiving conical rollers known per se and an annular member 37 closing one side of the pocket are joined by a pin member 38. This arrangement makes it possible to increase the number of rollers and minimize the reduction of load carrying capacity that results from the aforesaid reason.

Figure 8:
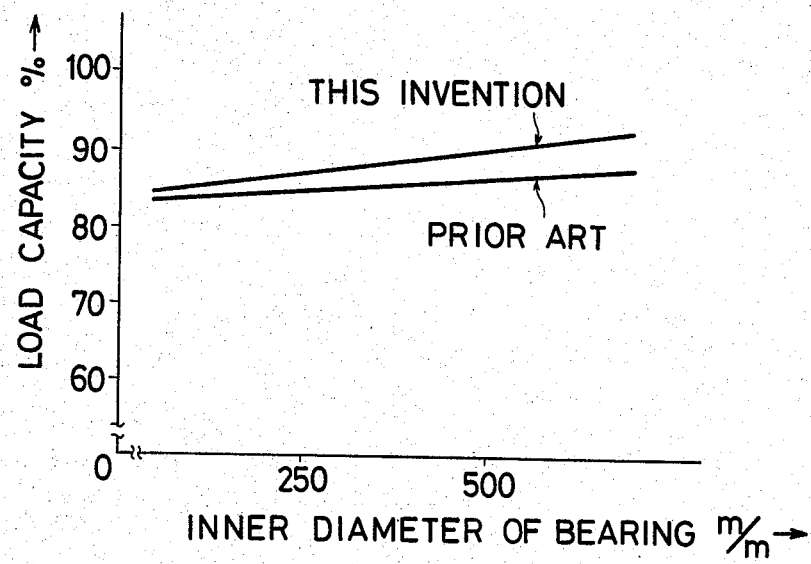
FIG. 8 is a graph showing the result of a comparison between the conventional example and the multi-row roller bearing device of this invention as to their load carrying capacity-increasing tendencies when the inner diameter of the inner races is increased.

FIG. 8 shows the result of a comparison between the bearing and the previously described conventional bearing as to their tendencies to increase the load carrying capacity as the inner diameter of the bearings is increased.

In addition, the embodiments have illustrated a four-row conical bearing assembly, but the bearing type is not limited thereto.

What is claimed is:

1. A sealed multi-row roller bearing device for rolling mills, characterized in that at the opposite ends of a multi-row roller bearing assembly, the outer ends of the inner races are axially extended beyond the ends of the outer races to form inner race extension annular portions, while non-contact type sealing means is installed at each end of said bearing assembly, said sealing means comprising a plurality of inner annular bodies each having respective outward flanges and axially put together and separably connected by clamp means and then fitted on the inner race extension annular portions so that the annular bodies which are disposed inwardly nearest to the bearing assembly cannot be easily separated form the inner race extension annular portions, and a plurality of outer annular bodies each having respective inward flanges and axially put together concentrically with the inner annular bodies and separably connected by clamp means so that said inward flanges alternate with the outward flanges to define clearances therebetween, said outer annular bodies being then positioned at the ends of the outer races.

2. A sealed multi-row roller bearing device for rolling mills as set forth in claim 1, wherein the inner and outer annular bodies are arranged so that the order of arrangement of the flanges from the inside to the outside of the bearing assembly starts at the outward flange, and the inner annular bodies which are inwardly nearest to the bearing assembly are shrinkage-fitted on the inner race extension annular portions.

3. A sealed multi-row roller bearing device for rolling mills as set forth in claim 1, wherein of the plurality of outer annular bodies, the one inwardly nearest to the bearing assembly is removably socket-and-spigot-wise connected to the end of the associated outer race.

4. A sealed multi-row roller bearing device as set forth in claim 3, wherein the depth of the socket-and-spigot connnection between the outer annular body and the end of the outer race is such that the slipping of the outer annular bodies off the outer race due to the presence of the axial clearances defined between the inward flanges of the outer annular bodies and the outward flanges of the inner annular bodies is prevented.

5. A sealed multi-row roller bearing device for rolling mills as set forth in claim 1, wherein the clearance defined between the inner and outer annular bodies has its openings, which are directed inwardly and outwardly of the bearing assembly, respectively, inclined toward the outer diameter.

6. A sealed multi-row roller bearing device for rolling mills as set forth in claim 1, wherein the inner annular bodies or the outer annular bodies are made, at least in the peripheral surface having flanges, of lubricating non-metal material.

7. A sealed multi-row roller bearing device for rolling mills as set forth in claim 1, wherein of the flanges of the inner and outer annular bodies, the one which is exposed at the outermost side has its thickness made greater than the other flanges.

8. A sealed multi-row roller bearing device for rolling mills as set forth in claim 1, wherein the retainer of the bearing is of the type in which a ring member formed with a roller pocket known per se and an annular member closing one side of said pocket are connected by a pin member.

* * * * *